Dec. 23, 1969         J. G. HERSHELMAN         3,485,773
              EPIHALOHYDRIN POLYMER RECOVERY
                    Filed March 12, 1968
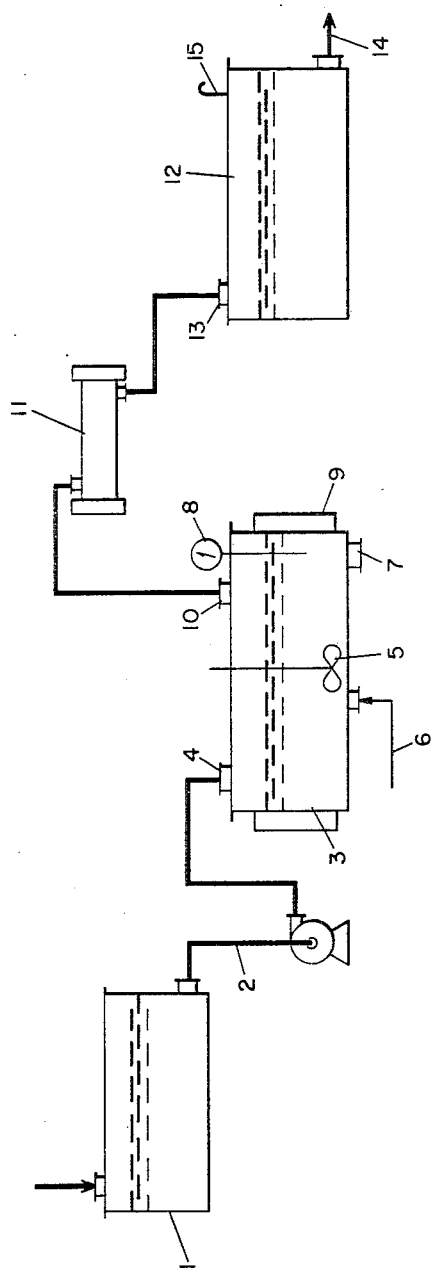
                                    JACK G. HERSHELMAN
                                        INVENTOR.
                                BY
                                        ATTORNEY

United States Patent Office 3,485,773
Patented Dec. 23, 1969

3,485,773
EPIHALOHYDRIN POLYMER RECOVERY
Jack G. Hershelman, Wilmington, Del., assignor to Hercules Incorporated, Wilmington, Del., a corporation of Delaware
Filed Mar. 12, 1968, Ser. No. 712,501
Int. Cl. C08g 53/18, 23/20
U.S. Cl. 260—2                                                8 Claims

ABSTRACT OF THE DISCLOSURE

It has been found that epihalohydrin polymers can be recovered from organic solvent solutions in the form of nontacky porous crumb by a steam coagulation process if the polymer-solvent solution is first treated with a nonionic hydrophobic surfactant and dispersed with water.

---

This invention relates to an improved process for the recovery of epiholahydrin polymers. In particular this invention relates to an improved process for the recovery of epihalohydrin polymers from organic solvent solutions by a steam coagulation process.

It is known in the manufacture of synthetic polymers to recover the product from a solution in organic solvents by steam coagulation. The solvent is removed as the water azeotrope and an aqueous slurry of a solid polymer is left as the residue. The polymer crumb is then separated from the water and dried. However, when the steam coagulation process is used to recover epihalohydrin polymers, from the organic solvent solutions in which they are manufactured, the partially coagulated polymer agglomerates adhering to the surfaces of the coagulating vessel thus plugging up the process lines and preventing the diffusion of organic solvent out of the mass.

It is an object of this invention, therefore, to provide a practical process for the recovery of epihalohydrin polymers from organic solvent solutions by the steam coagulation technique. It is a further objective of this invention to provide a process for the recovery of epihalohydrin polymers from organic solvent solutions in the form of nontacky porous crumb. It is still a further objective of this invention to provide a process for the recovery of epihalohydrin polymers from organic solvent solutions in a reduced time requiring less steam for complete removal of the organic solvent.

Now in accordance with this invention it has been found that all of the above objectives plus others can be obtained if certain critical process steps are followed. The specific critical process steps are (1) the pretreatment of the polymer-solvent solution with from about 2% to about 10% by weight based on the weight of the polymer of a nonionic, hydrophobic surfactant and (2) predispersing water into the polymer-solvent solution in an amount of at least about 10% by weight based on the weight of the polymer.

It is believed that by predispersing water into the polymer-solvent solution, prior to coagulation, the water needed for azeotrope formation is provided internally. When the center of a drop of polymer-solvent solution reaches the proper temperature, the azeotrope starts to form. Internal vapor bubbles are generated which eventually burst releasing the azeotrope vapor creating surface for further diffusion of solvent out of the polymer. The resulting polymer particles are encapsulated by a monomolecular layer of surfactant. The particle surfaces are thus rendered hydrophilic so that they repel each other and do not agglomerate.

Any nonionic, hydrophobic surfactant can be used in the process of this invention provided it has a hydrophile-lipophile balance (i.e., HLB) of from about 2.0 to about 8.6. The hydrophile-lipophile balance is an expression of the relative simultaneous attraction of a surfactant for water and for oil. For a further discussion of HLB see Kirk-Othmer Encyclopedia of Chemical Technology, second edition, vol. 8, pages 131—132 (1965) Interscience Publishers. Those surfactants with an HLB of from about 2.0 to about 8.6 can be characterized as being hydrophobic. Typical nonionic hydrophobic surfactants which can be used in accordance with this invention are sorbitan tristearate, polyoxyethylene sorbitan hexastearate, ethylene glycol fatty acid esters, monoglycerides of fat forming fatty acids, diglycerides of fat forming fatty acids, propylene glycol fatty acid esters, propylene glycol monostearate, sorbitan sesquioleate, polyoxyethylene sorbitol-4,5-oleate, glycerol monostearate, sorbitan monooleate, sorbitan partial fatty esters, sorbitan monostearate, the reaction product of two moles of polyoxyethylene with one mole of stearyl ether, the reaction product of two moles of polyoxyethylene with one mole of oleyl ether, polyoxyethylene sorbitol beeswax derivatives, the reaction product of two moles of polyoxyethylene with one mole of cetyl ether, diethylene glycol monolaurate, sorbitan monopalmitate, polyoxypropylene manitol dioleate, polyoxyethylene sorbitol lanolin derivatives, sorbitan monolaurate and the like.

Any polymer of an epihalohydrin including amorphous, crystalline, isotactic, etc. polymers of epihalohydrins can be recovered from organic solvent solutions in accordance with the process of this invention. Such polymers can be homopolymers prepared by polymerizing any monomeric epihalohydrin, for example epifluorohydrin, epichlorohydrin, epibromohydrin or epiiodohydrin. They can also be copolymers in which the repeating units are derived from mixtures in any proportion of two or more molecular species of monomeric epihalohydrins such as for example mixtures of epichlorohydrin and epibromohydrin or mixtures of epibromohydrin, epifluorohydrin and epiiodohydrin. They can also be copolymers of epiholohydrins with one or more other epoxides in which a major amount of the repeating units, e.g., at least about 50% by weight, are derived from epihalohydrins such as, for example, a copolymer of propylene oxide and epichlorohydrin or a terpolymer of epichlorohydrin, ethylene oxide and allyl glycidyl ether. The polymer may be essentially wholy amorphous, a mixture of amorphous and crystalline polymers or essentially completely crystalline.

The epihalohydrin polymers recovered in accordance with this invention are essentially linear polyethers in which the polymerization at least in major part has taken place through the epoxide linkage so that the polymer contains halomethyl groups attached to the main polymer chain. The homopolymers are belived to have the following general formula:

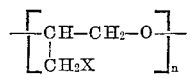

in which X is halogen and $n$ is a numeral designating the number of repeating units in the polymer. In the same way when an epihalohydrin is copolymerized with one or more other expoxides (including other epihalohydrins) polymerization takes place through the epoxide linkage even though other polymerizable groups may be present and it is apparent that such polymers also contain halomethyl groups attached to the main polymer chain.

Typical of other epoxides that can be polymerized to produce the polymers recoverable in accordance with this invention are the alkylene oxides such as ethylene oxide, propylene oxide, butene-1 oxide, cis and trans butene-2 oxide, hexene-1 oxide, hexene-2 oxide, dodecene-1 oxide, isobutylene epoxide, and the like; cycloaliphatic epoxides such as cyclohexene oxides, vinyl cyclohexene oxides (both mono and dioxides), α-pinene epoxide, dipentene epoxide, and the like; epoxy ethers such as ethyl glycidyl ether, isopropyl glycidyl ether, tertiary butyl glycidyl ether, phenyl glycidyl ether, chlorophenyl glycidyl ether, 2-chloroethyl glycidyl ether, ethylphenyl glycidyl ether, vinyl glycidyl ether, allyl glycidyl ether, methallyl glycidyl ether, vinyl cyclohexyl glycidyl ether, o-allylphenyl glycidyl ether, p-vinylbenzyl glycidyl ether and the like; ethylenically unsaturated gylcidyl esters such as glycidyl crotonate, glycidyl oleate, glycidyl methacrylate, and the like; and other epoxides such as for example, styrene oxide, alpha-methyl styrene oxide, butadiene monoxide, butadiene dioxide, epoxystearates, 3,4-epoxy-1-pentene, 3,4-epoxy-1-vinylcyclohexane, divinyl benzylmonoxide, and the like.

The polymers recovered in accordance with this invention can be prepared by contacting an epihalohydrin monomer, mixture of epihalohydrin monomers, or mixtures of one or more epihalohydrin monomers and at least one other epoxide monomer with an organoaluminum compound, preferably one which has been reacted with about 0.01 to about 1.5 moles of a chelating agent such as acetylacetone, benzoylacetone, acetoacetic acid, ethyl glycolate, oxalic acid, glyoxal monoxine, and the like and/or reacted with from about 0.1 to about 1.5 moles of water per mole of the organoaluminum compound. Exemplary of the organoaluminum compounds that can be so reacted with the chelating agent and/or water and used as a catalyst are triethylaluminum, triisobutylaluminum, diethylaluminum hydride and the like. The polymerization reaction is generally carried out in the presence of an inert liquid organic diluent. Suitable diluents which can be used for the polymerization are the aromatic hydrocarbons, such as benzene, toluene, xylene, cumene, p-cymene, and the like. In the manufacture of these polymers the product is frequently recovered from a solution in an organic solvent. Generally the organic solvent will be the one in which the polymer was prepared.

The epihalohydrin polymers generally contain a small amount (i.e., from about 0.1% to about 2% by weight) of antioxidant added at the time of their preparation. Exemplary of the most preferred antioxidants are phenyl-β-naphthylamine, di - β - naphthyl-para-phenylenediamine, symmetrical-di-β-naphthyl-p-phenylenediamine, N-isooctyl-p-aminophenol, the reaction product of diphenylamine and acetone, polymerized trimethyldihydroquinoline, nickel dibutyldithiocarbamate, 4,4′-thio-bis(6-tertiary-butyl-m-cresol), the reaction product of crotonaldehyde and 3-methyl-6-tertiary-butyl phenol, and the like.

The process of this invention can be carried out in various types of apparatus and either as a batch or continuous process. Likewise the critical steps of pretreating the polymer-solvent solution with surfactant and predispersing water therein can be carried out separately or simultaneously. In general, however, the polymer-solvent solution will be pretreated with at least one surfactant then water dispersed in the solution and the resulting mixture slowly added to a large amount of boiling water with steam sparging. As stated above the surfactant will be used in an amount of from about 2% to about 10% by weight based on the weight of the polymer and at least about 10% by weight based on the weight of the polymer of water will be predispersed with the polymer-solvent solution. The predispersion of water in amounts appreciably over 100% can be used but is not economical. The process of this invention can be used to remove epihalohydrin polymers from organic solvent solutions of any concentration. In general, however, the solutions will be those obtained following the polymerization of epihalohydrin monomers. These solutions will generally contain between about 5% and about 20% by weight of polymer. The temperature and pressure maintained during coagulation of the polymer will depend upon the specific organic solvent as well as the specific polymer being recovered. The pressure can vary over a large range, as, for example, coagulation can be carried out under vacuum or up to a pressure above atmospheric. In general, however, the temperature will be within the range of from about 50° C. to about 150° C. and the pressure will be within the range of from about 2 p.s.i.a. to about 50 p.s.i.a.

The drawing shows a diagrammatic representation of one type of apparatus suitable for carrying out the process of this invention. The reservoir 1 can be used for pretreating the polymer-solvent solution with a surfactant and predispersing water. From reservoir 1 the thus treated polymer-solvent solution is pumped via line 2 and slowly metered into coagulator 3 through inlet 4. Coagulator 3 is equipped with an agitator 5, steam sparge 6, drain 7, temperature and pressure gauge 8, heating jacket 9, inlet 4 and outlet 10. The water-organic solvent azeotrope vapors generated in coagulator 3 pass through outlet 10 to condenser 11. The thus liquified azeotropic mixture passes into recovery vessel 12 which is equipped with inlet 13, drain 14 and vent 15.

The following examples will illustrate the invention all parts and percentages being by weight.

EXAMPLE 1

This example demonstrates the recovery of polyepichlorohydrin from toluene solution. The polyepichlorohydrin has a molecular weight of approximately 500,000 and is present in the toluene solution in a concentration of 11 weight percent, the solution containing approximately 0.1 weight percent of a commercial condensed phenolic antioxidant.

To 500 parts of the polymer-solvent solution is added 3 parts of sorbitan monostearate having an HLB of 4.7 dissolved in 50 parts of toluene and into the resulting blend is dispersed 55 parts of water. The mixture of polymer-solvent solution containing the dispersed water and surfactant is slowly added, over a period of 1 and ¼ hours, to a coagulator operated at atmospheric pressure. The coagulator contains 1500 parts of water which is heated to boiling. It is equipped with a steam sparge and agitator. During the addition of the polymer mixture, the agitator is run at approximately 450 r.p.m. The steam sparge pressure is maintained at 5 p.s.i.g. and approximately 3162 parts of steam is used. The steam to polymer ratio is approximately 51.3. The dry polymer product amounts to 55 parts which represents a recovery of 100%. The polymer crumb ranges from about ⅛ inch to about ⅜ inch in diameter and is spongy due to the blowing action of the internally generated toluene-water azeotrope. The crumbs do not agglomerate and there is no odor of toluene in the wet crumb.

A sample of the polymer-solvent solution containing no surfactant or predispersed water is added to the coagulator exactly as described above. Within a short time the polymer agglomerates and sticks to the sides of the vessel rendering the coagulation process ineffective and plugging the process lines.

EXAMPLE 2

This example demonstrates the continuous recovery of polyepichlorohydrin from the solution in which it is prepared.

The polymer is prepared in a benzene solution using a triisobutylaluminum-water catalyst. After the polymerization the catalyst is killed by adding a small amount of isopropyl alcohol. Then about 0.1% by weight (based on the polymer) of a commercial antioxidant is added. The resulting solution contains approximately 11% by weight of polyepichlorohydrin and has a molecular weight of approximately 800,000.

The polymer-solvent solution is continuously pretreated with sorbitan monostearate dissolved in benzene in an amount equivalent to 4% by weight of the surfactant based on the weight of the polymer and predispersed with water in an amount equivalent to 100% by weight based on the weight of the polymer.

The mixture of polymer-solvent solution containing the dispersed water and surfactant is continuously added to a coagulator at a rate of 40 gallons per hour. The operating pressure within the coagulator is maintained at 35 p.s.i.g. and the temperature at 135° C. The water fed to the coagulator and the slurry removed are regulated so as to maintain the slurry solids concentration at about 7% by weight. The slurry is continuously and automatically removed by means of a dip tube to a stripper operated at atmospheric pressure, where the polymer crumb is given an additional steam sparging to remove any residual solvent. The slurry is then removed from the stripper and the water separated by screening. Recovery of dried spongy polymer crumb amounts to approximately 100%. The crumbs are from about 1/8 inch to 3/8 inch in diameter, they do not agglomerate and there is no odor of benzene. The steam to polymer ratio is approximately 15.

EXAMPLE 3

This example demonstrates the recovery of an ethylene oxide—epichlorohydrin copolymer from xylene solution. The copolymer contains approximately 34% by weight of ethylene oxide, has a Mooney viscosity of 52 and is present in the xylene solution in a concentration of 9 weight percent. The solution also contains approximately 0.1 weight percent of a nickel dibutyldithiocarbamate antioxidant.

To 500 parts of the copolymer-solvent solution is added about 5 parts of sorbitan monopalmitate having an HLB of 6.7 dissolved in 50 parts of xylene and into the resulting blend is dispersed 30 parts of water. The mixture of copolymer-solvent solution containing the dispersed water and surfactant is slowly added over a period of 1½ hours to a coagulator operated at atmospheric pressure. The coagulator contains 1300 parts of water which is heated to boiling. It is equipped with a steam sparge and agitator. During the addition of the copolymer mixture, the agitator is run at approximately 500 r.p.m. The steam sparge pressure is maintained at 5 p.s.i.g. and approximately 2200 parts of the steam is used. The steam to copolymer ratio is approximately 49. The dry copolymer product amounts to 45 parts which represents a recovery of 100%. The copolymer crumb ranges from about 1/8 inch to 3/8 inch in diameter and is spongy due to the blowing action of the internally generated xylene-water azeotrope. The crumbs do not agglomerate and there is no odor of xylene in the wet crumb.

What I claim and desire to protect by Letters Patent is:

1. In the process of recovering an epihalohydrin polymer from organic solvent solution by steam coagulation the improvement of (1) pretreating said polymer-solvent solution with from about 2% to about 10% by weight based on the weight of the polymer of at least one nonionic hydrophobic surfactant having a hydrophile-lipophile balance of from about 2.0 to about 8.6 and (2) predispersing in said polymer-solvent solution at least about 10% by weight based on the weight of the polymer of water.

2. The process of claim 1 wherein said epihalohydrin polymer is polyepichlorohydrin.

3. The process of claim 1 wherein said epihalohydrin polymer is a copolymer of epichlorohydrin and at least one alkylene oxide.

4. The process of claim 1 wherein said organic solvent is toluene.

5. The process of claim 1 wherein said organic solvent is benzene.

6. The process of claim 1 wherein said organic solvent is xylene.

7. The process of claim 1 wherein said nonionic hydrophobic surfactant is sorbitan monostearate.

8. The process of claim 1 wherein said nonionic hydrophobic surfactant is sorbitan monopalmitate.

References Cited

UNITED STATES PATENTS

| | | | |
|---|---|---|---|
| 3,135,706 | 6/1964 | Vandenberg | 260—2 |
| 3,305,565 | 2/1967 | Mueller | 260—348.6 |
| 3,414,529 | 12/1968 | Green et al. | 260—2 |

WILLIAM H. SHORT, Primary Examiner

E. NIELSEN, Assistant Examiner

U.S. Cl. X.R.

260—29.2